Feb. 9, 1937. J. P. HERSHMAN 2,070,403
EAR FITTING FOR EXCLUDING WATER OR DIMINISHING SOUND
Filed March 4, 1936

Inventor:-
Joseph P. Hershman
Walter Gunn
By his Attorney.

Patented Feb. 9, 1937

2,070,403

UNITED STATES PATENT OFFICE 2,070,403

EAR FITTING FOR EXCLUDING WATER OR DIMINISHING SOUND

Joseph Percy Hershman, Nottingham, England

Application March 4, 1936, Serial No. 67,079
In Great Britain November 7, 1934

1 Claim. (Cl. 128—151)

This invention refers to ear fittings for use by bathers and others to prevent water entering and injuring the ears, while not excluding sound or for use by persons who are sensitive to sounds and desire quietness.

Hitherto ear fittings (commonly called ear plugs) for excluding water while bathing have required to be tightly fitted into the inner auditory canal parts of the ears, which causes discomfort to the user.

One object of this invention is to provide ear fittings for the purpose of excluding water which can be securely applied to the ears without any part requiring to project and fit tightly into the auditory canal. A further object is to provide an ear fitting for excluding water while bathing, which has little or no effect on the hearing. Another object is to provide an ear fitting, which while not requiring to closely fit the inner auditory canal, can be used merely to deaden sound and as such can be used by persons who desire quietness.

According to the invention, the improved ear fittings are each made of fairly soft elastic india-rubber and with a part which outwardly is formed to a shape and size such as to follow and yieldingly fit those outer portions of the ear of which the concha, tragus, anti-helix and fossa of the anti-helix form part. Each fitting is also made with a part which extends laterally from the first-named part and lies opposite to and projects only slightly into the entrance of the auditory canal, no part touching the inner walls of such canal, and the improved fitting, as a whole, when in position, completely closing the entrance to the auditory canal. Said lateral part is of hollow conical formation with its narrower part next the auditory canal, and while open at its larger end, it is closed at its narrower end. Such closed end is comparatively thin (diaphragm like) so as to allow sound to reach the ear drum while excluding water, or it is of a thicker section so as to exclude both water and sound. Further, a small tapered plug is provided adapted removably to fit the said hollow lateral part and act as a handle in applying the fitting to the ear.

The improved fittings will be made in pairs, right and left handed.

The invention is illustrated in the accompanying drawing, wherein:—

Figure 5:

Fig. 5 a rear face or side view of the right-hand ear fitting.

Figure 6:

Fig. 6 is a front edge view, and

Figure 7:

Fig. 7 a rear edge view of the right-hand ear fitting.

Figure 8:
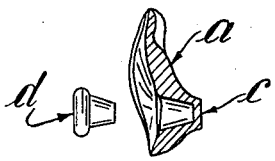

Fig. 8 is a front vertical section of the same fitting and a side view of a plug that may be used with the fitting.

Figure 9:
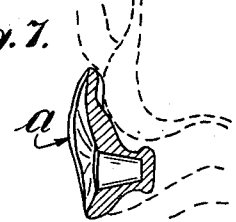

Fig. 9 is a front vertical section of a like fitting, as adapted for excluding sound as well as water.

Figure 1:
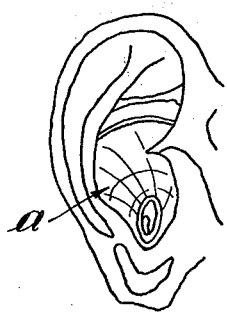
Fig. 1 is a face or side view of the improved fitting adapted for use with the right-hand ear.
Figure 2:
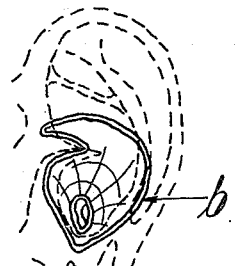
Fig. 2 is a like view of the improved fitting adapted for use with the left-hand ear.

Referring to Figs. 1 and 2, the ear fittings $a$, $b$, are made to the exterior shapes shown, and one to engage the right-hand ear and the other to engage the left-hand ear by reason of their contour and size following the anatomical formations of the ears, and also by reason of their flexibility.

Figure 3:
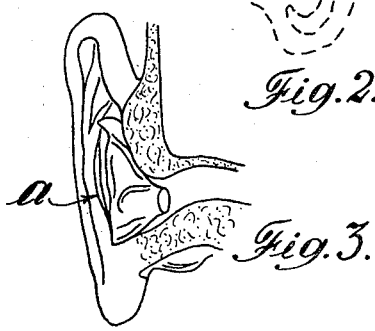
Fig. 3 is a vertical section of the right-hand ear and a front edge view of the improved fitting applied to such ear.
Figure 4:
Fig. 4 is a further face or side view.

The lateral formation of each fitting is also such as to follow the transverse shape of the ear and without touching its walls to project into the entrance of the auditory canal, see Fig. 3. The cross section of the fitting is best seen in Fig. 8. The lateral part of the fitting which is hollow and slightly conical terminates in a thin (diaphragm-like) part $c$.

With the improved fittings thus made and fixed in the user's ear, they serve to prevent water entering the ears, whilst allowing sound to reach the ear drums.

To facilitate the placing of the fittings in the ears, a small plug $d$, see Fig. 8, is provided, which, after the fitting may be in position, is withdrawn.

When the improved fitting is used to exclude sound, the plug may remain in the fitting, or the hollow transverse part $c$ of the fitting may be thickened, and enlarged as shown in Fig. 9.

What I claim is:—

An ear fitting made wholly of fairly soft india-rubber, and formed at one part to an outward shape and proportions corresponding to the anatomical formation of the outer parts of the ear of which the concha, tragus, anti-helix and fossa of the anti-helix form part, and by which the fitting may be fitted in the said outer parts, said fittings being also formed with a hollow lateral part, which, on the fitting being secured to the ear, as aforesaid, lies oppposite to and projects only slightly into the auditory canal of the ear, no part touching the inner walls of such canal; said hollow lateral part at the end nearest the ear drum being closed by a relatively thin wall of the rubber, but open at its other end, and the fitting, as a whole, when in engagement with the outer parts of the ear, completely closing the entrance to the auditory canal, and, in conjunction with the closed end of the hollow lateral part, sealing the entrance to the ear, and for use in manipulating the ear fitting when applying it to the ear, a rubber plug adapted removably to fit the entrance of the hollow lateral part of the fitting.

JOSEPH PERCY HERSHMAN.